United States Patent [19]

Bank et al.

[11] Patent Number: 4,505,220

[45] Date of Patent: Mar. 19, 1985

[54] APPARATUS FOR COATING AND FLAVORING ICE CREAM CONES

[75] Inventors: Herbert M. Bank; Irving H. Rubenstein, both of Owings Mills, Md.

[73] Assignee: Maryland Cup Corporation, Owings Mills, Md.

[21] Appl. No.: 294,243

[22] Filed: Aug. 19, 1981

Related U.S. Application Data

[62] Division of Ser. No. 175,374, Aug. 5, 1980.

[51] Int. Cl.³ .......................... B05C 7/02; B05C 7/04; B05C 11/08
[52] U.S. Cl. ........................................ 118/16; 118/20; 118/25; 118/31; 118/55; 118/56; 118/314; 118/408
[58] Field of Search .................. 118/16, 25, 54, 55, 118/56, 314, 31, 408, 409, 20, 26; 426/306, 307

[56] References Cited

U.S. PATENT DOCUMENTS

| | | | |
|---|---|---|---|
| 1,602,836 | 10/1926 | Reifsnyder | 118/56 |
| 1,894,729 | 1/1933 | Bozarth | 118/314 X |
| 2,368,046 | 1/1945 | Sidebotham | 118/55 |
| 3,053,221 | 9/1962 | Heffley et al. | 118/55 X |
| 3,800,741 | 4/1974 | Boulton | 118/55 X |
| 4,052,494 | 10/1977 | Garrigan et al. | 118/55 X |

*Primary Examiner*—John P. McIntosh
*Attorney, Agent, or Firm*—McDougall, Hersh & Scott

[57] ABSTRACT

A method and apparatus for coating edible food containers with flavored barrier coatings. The coating material is allowed to flow into the interior of the container to coat the same. The containers are then manipulated to remove the excess and dried. A coating is then flown onto the exterior of the container which is subsequently dried.

3 Claims, 5 Drawing Figures

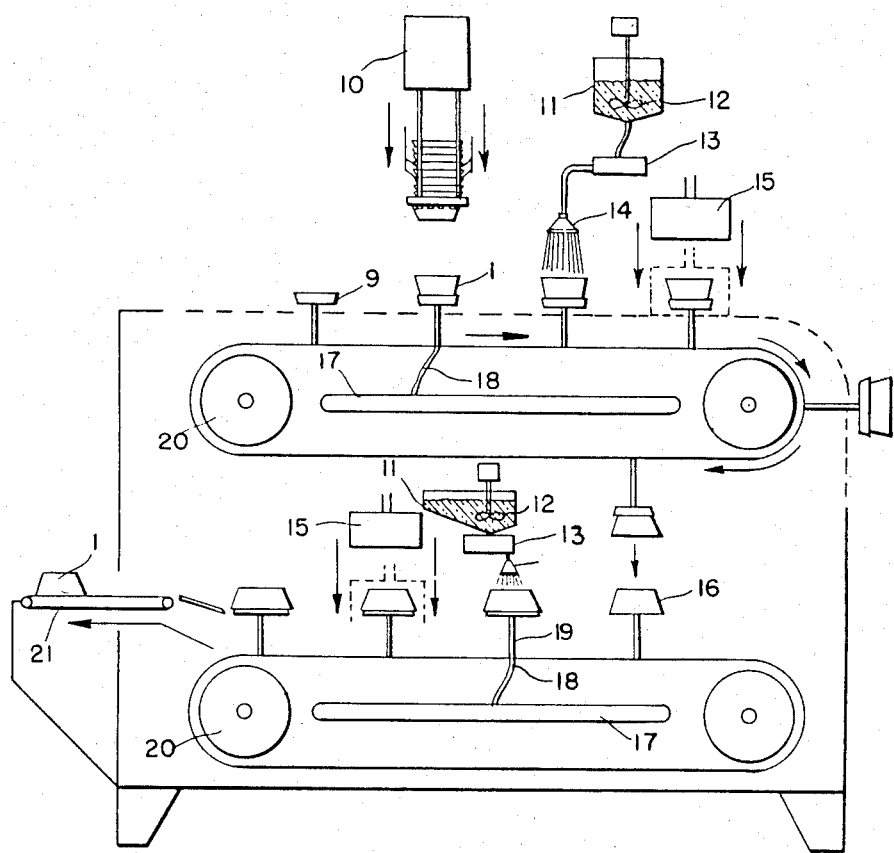
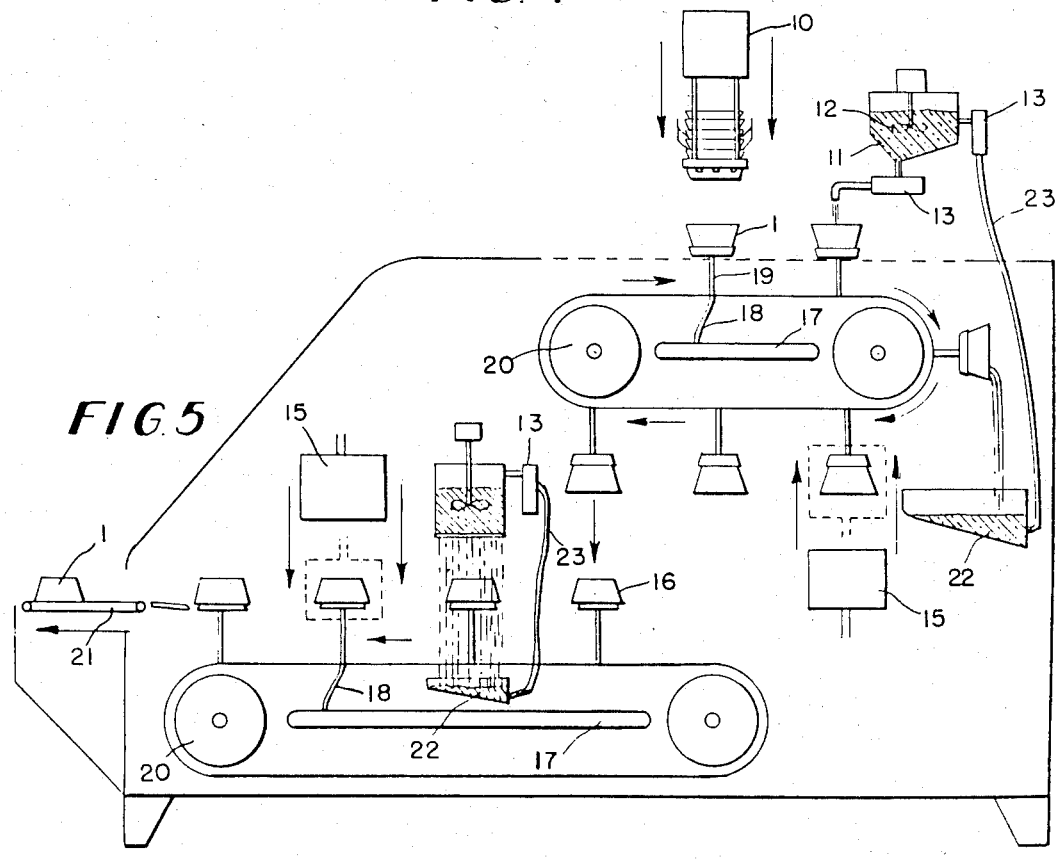

4,505,220

APPARATUS FOR COATING AND FLAVORING ICE CREAM CONES

This application is a divisional of copending application Ser. No. 175,374, filed on Aug. 5, 1980.

BACKGROUND AND SUMMARY OF THE INVENTION

The present invention is directed to food containers, particularly edible food containers containing a barrier coating provided on at least one of the surfaces of the container. The present invention is also concerned with a method and apparatus of applying a barrier coating which may contain a food flavor to at least one of the surfaces of edible food containers.

There are two basic methods for the manufacture of ice cream cones. One of the methods is concerned with the manufacture of molded cones which involves depositing a semi-fluid batter consisting of such ingredients as water, flour, sugar, shortening, leavening, lecithin and flavor into a mold. After the batter is disposed in the mold, a core is inserted into the mold so that the batter is forced to assume the shape of the space provided between the core and the mold. As a result, it is possible to mold cones of a conical shape or cups of various sizes and configurations. Once the core of the mold is joined with the batter, the molds are subjected to heat for an appropriate length of time, at which point the cores are removed, the molds are broken open and the cones are discharged onto a conveyor for possible trimming and for packing.

This process of molding cones has certain limitations. The ratio of sugar to flour must necessarily be small since sugar causes the cones to stick to the molds. Optimum operations generally involve using less than six percent sugar, based on the weight of the flour. Some ovens used for the manufacture of molded cones have been modified, for example, by changing the configuration of the cones and the method used for the molds, in order to provide with larger amounts of sugar, for example as much as 35 percent, based on the weight of the flour. Unfortunately, there are certain drawbacks with this procedure. It is axiomatic in the industry that the higher the sugar content, the more that carmelization takes place on the molds and the more frequency is the need to clean the molds. Since the cleaning of the molds is a laborious process involving removing the molds from the ovens, it has not been economically feasible to use a high ratio of sugar to flour in a molded cone. Cleaning the molds does not completely solve the problem of making a satisfactory product for even slight sticking can destroy the sidewall of the cone and make an unsaleable product. As a result, low level sugars are used so that the resulting container is a bland but pleasant complement to ice cream.

The second method for the manufacture of ice cream cones is based on a principle of baking a flat waffle between two plates to make the so-called sugar roll cone. The resulting product which is a flat sheet with an inscribed surface on the top thereof, is picked up mechanically and transferred to a piece of equipment that rolls the flat waffle into the conical shape we recognize as an ice cream cone. The phenomenon that permits this rolling process is the transformation, during the baking process, of crystalline sugar into its fluid state, since during the baking operation, the waffle reaches a temperature in excess of 300° F. To bake such a cone requires a concentration of sugar of from 20-50% or even higher, based on the weight of the flour, to provide the plasticity for the hot waffle to be rolled to the necessary shape. However, there is a problem with the pliability of the waffle, for if the waffle is too soft it is very difficult to pick up mechanically and roll. Also, once the cone has been rolled, it must not lose its shape and become "out of round" when it is dropped onto a conveyor while it is still hot and the sugar has not yet had a sufficient time to crystallize. Making a good cone is both the function of the temperature of the cone as it is discharged from the rolling mechanism and the amount of sugar in the formula. Some ovens permit, and even need, higher sugar levels than others so that the physical limitations of the oven often dictate the formula that can be used. The above mentioned factors are characteristic of industry practices.

When it is desired to add flavor and moisture resistance to cones, the cones are often put through chocolate enrobers wherein either pure chocolate coating containing cocoa butter or a compound coating which is a mixture of cocoa and vegetable fats are applied to the cone to enclose the cone in a flavored fat-base material. The problem with this technique is that great care must be exercised in the handling and shipping of cones during warm weather, for obviously the coating will melt during extreme shipping temperatures which can reach as high as 140° F. in a railroad boxcar. If fat or a higher melting point material is used to compensate for this problem, the eating qualities of the finished cone are adversely effected inasmuch as the high melting point fats have an unpleasant, waxy feel to the mouth.

After ice cream cones, either molded or rolled, are baked, there are intrinsic problems in handling, shipping and finally serving the cones. Ice cream cones are, by their very nature, fragile containers, so that great care must be taken to pack these products in materials that will protect them against breakage as they travel from the bakery to the warehouses and ulitmately to the user. When the cones arrive at their destination they must be strong enough to accept the pressure of a dipped ball of frozen food product, for example, ice cream, when it is placed on the top of the cone. An operator dispensing ice cream must, of necessity, be sure that the ice cream sufficiently adheres to the cone. Thus, a degree of pressure is necessary to force the ball of ice cream onto the rim of the cone. Either because of a lack of skill of the operator or the inherent weakness of the cone there is the constant problem of the cone breaking in the process. As a result, it has long been an objective of the ice cream cone manufacturers to find a method of increasing the strength of the core.

Sugar roll cones and to some extent molded cones are frequently used for prepacking ice cream rather than for handling ice cream at the point of service. When ice cream cones are prepacked and the combined ice cream and cone are stored in a freezer, the cone tends to absorb moisture from the ice cream. In addition, any snow or condensate that has deposited on the outside of the cone during storage melts upon exposure to ambient temperatures which further contributes to a soggy cone. Ice cream, as it is extruded from a freezer in the form of soft ice cream at a temperature of from 19° to 26° F. contains only about 30% of its water in the form of ice, while the remaining portion of the water is simply trapped in the matrix of the ice cream. The freezing of most of the remaining water in a storage area can take anywhere from one hour to forty-eight hours, depending on whether the ice cream factory has a fast freeze tunnel or relies on normal freezer temperatures of anywhere from −40° F. to −10° F. to accomplish this purpose. Because of this time lag in freezing the ice cream, the free water is often absorbed by the cone causing a soggy mass since there is no liquid or water barrier which exists between the cone and the ice cream. Mechanisms have been developed to spray cones with chocolate coating just prior to the dispensing of the ice cream into the cone from a filling machine. Unfortunately, spraying has been found to deposit a multiple series of droplets on the inside surface of the cone so there is the possibility of uncoating the surfaces between the particles of chocolate coating. These uncoated surface areas provide a "pathway" for moisture to penetrate the cone and eventually render soggy the baked portion disposed behind the coating.

Accordingly, an object of the present invention is to provide edible food containers which possess increased moisture resistance.

Another object of the present invention is to provide improved edible food containers which are effective in holding a plurality of both hot and cold food products without absorbing or otherwise being adversely effected by the food product.

A further object of the present invention is to provide an edible food container which possesses increased strength, and, as such, substantially eliminates damage caused to the containers during manufacture, storage, packing and use.

Still another object of the present invention is to provide edible food containers which posses increased sweetness, particularly containers used for jello, pudding, desserts, and the like.

A still further object of the present invention is to provide edible food containers which possess a flavor which is compatible with the contents to be stored therein.

Yet another object of the present invention is to provide edible food containers with a barrier coating disposed on at least one of the surfaces thereof to achieve increased strength, and/or increased moisture resistance, and/or increased flavor and/or increased sweetness of the food containers.

An additional object of the present invention is to provide an improved method and apparatus for applying a barrier coating to at least one surface of an edible food container.

Other objects and further scope of applicability of the present invention will become apparent from the detailed descriptions given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, the above-identified disadvantages have been eliminated and a new and improved barrier coating composition for edible food containers, as well as an improved method and apparatus for applying the barrier coating to at least one surface of edible food containers have been developed which achieve the objects of the present invention.

When considering edible food containers for dessert-type food products such as ice cream, jello, pudding, and the like, a barrier coating in the form of a continuous film is applied to the food container, such as for example, a molded cone or a rolled sugar cone. Advantageously, the barrier coating is applied to the inside surface of the edible food container so as to protect the container from undue moisture contributed by the food product which would otherwise be absorbed by the food container. It can be understood that where additional strength is desired, the outside surface of the food container can also be provided with a barrier coating.

In connection with barrier coatings for dessert-like food products such as ice cream, the barrier coating can comprise a sugar solution having a sugar content of about 50% by weight, However, a practical matter, because of the energy demands and other process limitations required to eliminate the large amount of water in such a solution, higher sugar contents have been found to be more effective. Thus, the barrier coating composition advantageously contains a higher sugar content, for example, a sugar syrup of about 80 to 86% by weight of sugar with the substantial balance being water and optionally a flavor producing ingredient. The high amount of sugar solids speeds up the crystallization of the sugar in the solution during cooling and after the application of the sugar syrup to the food container. Also, because of the high degree of sugar content, it is not necessary to utilize certain additives to facilitate the adhesion of the sugar syrup to the cone. Thus, the higher concentrations of sugar do not require any additives but do require an effective mechanical means, such as for example vigorous agitation, for suspending the sugar in the super-saturated mixture and preventing crystallization before it is applied to the container.

A sugar syrup having a sugar content of about 70 to 79% by weight are somewhat easier to maintain but, as a practical matter, require the addition of a gum material which is necessary to help provide adhesion of the sugar solution to the food container. Thus, although in some cases, it is possible to obtain a good penetration with a sugar syrup having a sugar content of about 70 to 79% by weight, without the presence of a gum, such a penetration takes a long period of time with continuous spinning to prevent the settling of the dilute liquid syrup. Thus, a sugar syrup containing about 70 to 79% by weight of sugar advantageously contains about 0.1 to 2% by weight of a gum material with the substantial balance being water which optionally may include a flavor-producing substance. The preferred sugar syrup has a sugar content of 77 to 78% by weight and used with a vegetable gum.

A typical sugar which can be used in the barrier coating of the present invention is sucrose which can be obtained from cane sugar or beet sugar. This sugar can be used in the form of a standard granulated sugar or as a 10× or 12× special grind. It is also possible that lactose and dextrose can be used as the sugar component in the present invention. However, the expense of these sugars and the fact that they are not as sweet as sucrose makes them not as effective as vehicles for carrying flavor.

The gum additives which can be used in the present invention include both vegetable gums and cellulose gums which are effective in helping the sugar slurry adhere to the wall of the food container. Suitable gums include sodium alginate, propylene glycol alginate, carrageenans, Xanthan gum, cellulose gums and modified cellulose gums such as hydroxy propyl methyl cellulose and hydroxy propyl cellulose. Combinations of gums also work effectively in the barrier coating of the present invention. Thus, for example, 0.5% by weight of sodium alginate and 1.0% by weigh of Avicel (mircocrystalline cellulose+carboxy methyl cellulose made by Hercules Corporation) work well together. Mixtures of Xanthan gum with either locust bean gum or guar gum appear to be particularly effective in that these mixtures appear to give more than a mere additive effect in facilitating the adherence of the barrier coating to the food container. The choice of the gum combination depends upon many variables such as drying time, thickness of the coating desired, texture of the coating, the particular flavor which is utilized and the like. For example, the Avicel alignate type coating provides a hard surface in direct contrast to the carrageenans which provide a softer type of coating. Also, propylene glycol alignate, which functions similarly as sodium alignate, has the additional advantage of working well in the presence of acid flavors.

Suitable flavors which can be utilized in the barrier coating composition of the present invention include the citric acid flavors such as orange, lemon, grapefruit, grape, and the like and non-acid flavors such as for example, banana, maple, and the like. If true or natural fruit flavors are utilized, in this case the fruit flavor inherently contains the necessary water content which is utilized in the barrier coating. However, if artificial flavors are utilized then both water and the artificial flavor must be added to make up the substantial balance of the barrier coating composition.

The following is a typical formulation of a barrier coating composition using a high sugar solids content but no gum or starch:

| Example 1 | |
|---|---|
| Sugar | 84.41% by weight |
| Water | 14.89% by weight |
| Flavor | 0.66% by weight |
| Color | 0.04% by weight |

The following are typical formulations of a barrier coating composition utilized in the present invention wherein a gum is present in the composition to provide the desired adhesive effect.

| Example 2 | |
|---|---|
| Sugar | 0.776 parts (77.6% by weight) |
| Water | 0.211 parts (21.1% by weight) |
| Carrageenan (Gelearin D.G.-Marina Colloids Co. | 0.001 parts (0.1% by weight) |
| Flavor | 0.006 parts (0.6% by weight) |
| Citric Acid Solution | 0.006 parts (0.6% by weight) |
| Example 3 | |
| Sugar | 0.776 parts (77.6% by weight) |
| Water | 0.196 parts (19.6% by weight) |
| Cellulose gum (Avacel 611) | 0.016 parts (1.6% by weight) |
| Flavor | 0.006 parts (0.6% by weight) |
| 50% Citric Acid Solution | 0.006 parts (0.6% by weight) |

Using the identical water-sugar ratio as outlined above, various coating formulations have been tested with advantageous results utilizing sodium alginate at 2% by weight in the formulation of Example 2 and, in a separate example, Kappa and Iota carrageenans in an amount of 0.5% by weight in the formulation of Example 2.

Generally speaking, the sugar syrups discussed above are generally utilized in providing a barrier coating for food containers, particularly edible food containers which are adapted to carry dessert-type foods such as ice cream products, frozen flavored ice products, jello, pudding, and the like. However, there are many flavors which can be incorporated into a barrier coating for edible food containers for which sugar is not a desirable ingredient. If, for example, the objective is to use a container such as a cone as a completely edible container for food products both solid and semi-liquid other than dessert type foods, it is desirable to make a barrier coating that is sugar-free. Likewise, if the only objective is to provide a film barrier on the edible container, colloids (gums) that have been utilized in conjunction with the sugar can be used alone. It should be noted here that the sugar syrups with the colloids added thereto can perform a better moisture barrier than those formed from sugar syrup alone.

Rye flavor, garlic flavor, onion flavor, and a variety of other flavors can be added to a gum solution in order to provide a suitable barrier coating for edible food containers. As a rule of thumb, a solution designed to be made without sugar generally has four times the gum concentration when compared to a coating used in conjunction with sugar.

The following is examplary of a formulation which can be used to produce a sugar-free barrier coating.

| Example 4 | |
|---|---|
| Water | 96.0 parts (96%) |
| Low viscosity sodium alginate | 3.5 parts (3.5%) |
| Rye bread flavor | 0.5 parts (0.5%) |
| TOTAL | 100.0 parts |

The solution was flo-coated in the same manner as described hereinbelow and drying was effected at a temperature of 225° F. It has also been found to be advantageous to utilize a barrier coating comprising a mixture as defined in U.S. Pat. No. 3,526,515, can be flo-coated of a fat plus a flavor-producing material. This mixture, similarly as described hereinbelow.

The barrier coating, for example, a sugar solution, can be applied to an edible food container, for example, a cone, by any method which is effective for achieving the objects of the present invention, such as for example:

(1) The coating can be sprayed on the container with or without rotating the container during the coating operation. This procedure can create some problems in that there is the danger of missing some spots on the container as in the case of the chocolate droplets already described.

(2) The cone can be filled with a syrup and then inverted, allowing the syrup plus liquid to flow into a reservoir. This is referred to as the fill and dump technique.

(3) An appropriate amount of the barrier coating is deposited in the bottom of the container. The container is then placed in a mechanism which is rotated at a high speed forcing the liquid coating against the inside of the container. Any excess liquid which escapes from the top of the container runs back into a reservoir for reuse. This procedure can be identified as a flow coat procedure.

(4) The coating could also be applied by simply dipping either the outside of the container or the entire container into a bath of a barrier coating composition.

In all of the above procedures, the edible food containers were dried at a temperature of about 225°–450° F.

Although all of the above coating procedures can be utilized in applying the barrier coat to the edible food containers of the present invention, the flow coat procedure was found to be particularly effective and is, in fact, the preferred method for applying the barrier coating to the container.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 4 shows a spray and spin apparatus and method for coating an edible food container with a barrier coating composition and FIG. 5 shows a fill and dump apparatus and method for coating an edible food container with a barrier coating composition.

DETAILED DESCRIPTION OF THE INVENTION

Figure 1:
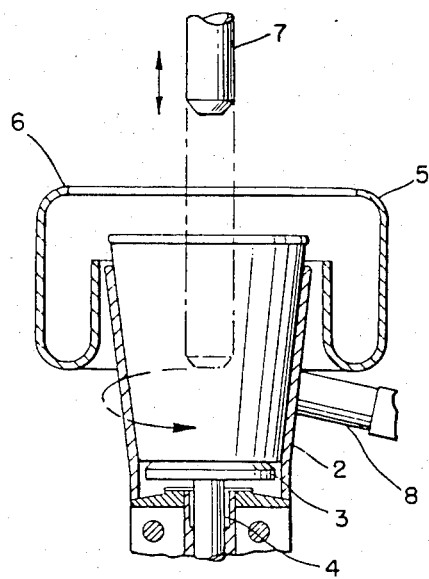
FIG. 1 is a device used for flow-coating an edible food container with a barrier coating composition.
Figure 2:
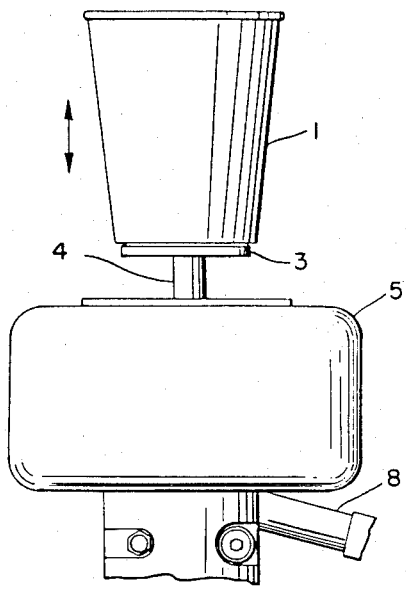
FIG. 2 is the device of FIG. 1 in a different position of operation.
Figure 3:
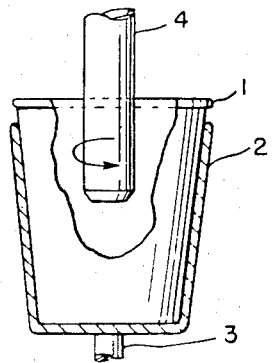
FIG. 3 is an alternative device for achieving the flow coat method of the present invention.

An apparatus which can be effectively utilized in conducting the flow-coat method of the present invention is shown in FIGS. 1, 2 and 3 of the present application. FIG. 1 shows a food container 1, which in this case is a cone, disposed in a rotatable receptacle 2. The cone is supported by a platform 3 and a vertical post member 4. The platform 3 and the vertical post member 4 are adapted to move in the vertical direction independent of the rotation of the receptacle 2. The upper portion of the receptacle is provided with an overflow reservoir 5 which is adapted to retain excess coating material which is discharged from the food container during the coating operation. The reservoir is provided with an aperture 6 which permits the introduction of a nozzle 7 into the cup for loading the cup with the barrier coating material prior to the flow-coat operation. The reservoir 5 is also provided with a conduit means 8 for recycling the overflow coating material to the nozzle means 6 for reuse.

In operation, and specifically referring to FIG. 1, the food container 1 to be coated is introduced into the receptacle 2. Then the coating material is introduced into the food container through nozzle 7 up to a predetermined level. The receptacle containing the cup is then rotated at a high speed forcing the coating liquid up the inside of the container, and uniformly coating the entire inside surface of the cone. Any excess coating liquid escaping from the top of the cone runs into the reservoir 5 where it is collected and eventually recycled through conduit 8 back to the feed nozzle 7. After the cone 1 has been uniformly coated on the inside thereof, it is removed from the receptacle tube through the aperture 6 provided in the reservoir 5 by the vertical movement of the platform 3 and the center post member 4 as shown in FIG. 2.

In an alternative embodiment of the apparatus of the present invention, the coating liquid can be forced up the inside of the container by the rotation of a mandrile centrally disposed within the food container. Thus, in this embodiment, rather than rotating the receptacle which holds the food container, the coating material can be introduced into the food container and then the mandrile can be rotated, thereby achieving the same result. In this latter embodiment, the nozzle which is used to introduce the flow-coating material into the food container can also function as the rotating mandrile to achieve the desired internal coating effect.

FIG. 4 shows the spray and spin method and apparatus for applying the barrier coat to an edible food container as defined by the present invention. In this system a plurality of vacuum pots 9 are mounted on a first conveyor system 20 provided with a vacuum system comprising a vacuum manifold 17 and vacuum lines 18 and 19 for producing a vacuum in the vacuum pots 9. A food container dispenser, for example a cup dispenser 10, a coating reservoir 11 and a shroud heater 15 are positioned along the conveyor system to effect the dispensing and coating of the inside surface of food cups. Thus as the vacuum pot 9 is conveyed beneath the cup dispenser 10, a food cup 1 to be coated is discharged into the vacuum pot where it is held in position by the vacuum produced by the vacuum manifold 17. The internal surface of the cup is then coated with a heated barrier coating from a reservoir 11, utilizing a pump 13 which is connected to a spray device 14 for spraying the internal surface of the cup. A stir 12 is rotatably disposed within the reservoir for maintaining the barrier coating material in a uniform state. After the cup is internally coated, it is conveyed to the drying stage of the process where a heated shroud is dropped over the container for uniformly heating and drying the same. During this drying step the cup is rotated so that the coating material can be uniformly distributed along the inside surface of the cup.

A second conveyor system 20 provided with a vacuum system comprising a vacuum manifold 17 and vacuum lines 18 and 19 is disposed below the first conveyor system. The second conveyor system contains a plurality of cup supports 16 for receiving an inverted cup from the first conveyor system. Thus, after the internal coating on the cup has been sufficiently dried in the drying stage of the first conveyor system, the shroud 15 is raised and the vacuum pot containing the internally coated cup is conveyed through a distance which permits further drying under ambient conditions to an inverted position above the second conveyor system containing the cup supports 16. Each cup support has a shape which conforms with the internal surface of the cup and operatively communicates with the vacuum system. As the inverted cup is positioned over a cup support, the vacuum on the vacuum pot is discontinued causing the cup to be effectively transferred from the vacuum pot to the cup support 16. The vacuum system associated with the cup support can then be initiated to hold the cup firmly to the cup support. Of course the vacuum produced in the cup support can be initiated at the same time as the vacuum is discontinued on the vacuum pot thereby facilitating the transfer of the cup from the inverted vacuum pot of the first conveyor system to the cup support of the second conveyor system. The cup support containing the inverted cup disposed thereon is then transferred to a coating station where the outside surface of the cup is coated by spraying, utilizing a coating reservoir, a pump and a spray device in a similar manner as in the coating of the internal surface of the cup. The coated cup is then conveyed to a drying station where the external surface of the cup is dried while the cup is spinning, utilizing a shroud heater in the same manner as described above. After drying, the shroud is raised and the cup is further dried and cooled in ambient air before being removed from the system by a conveyor 21.

FIG. 5 shows the fill and dump method and apparatus for applying a barrier coat to an edible food container as defined by the present invention. The fill and dump system of FIG. 5 has many similar features to the spray and spin system of FIG. 4 with the main difference being that the cup to be internally coated is filled with the barrier coating material to coat the internal surface of the cup and then the contents of the cup is dumped into a reservoir 22 from where it is recycled by conduit 23 and pump 13 back to the coating reservoir. The internally coated cup is spin dried utilizing a heated overspin shroud in the same manner as described above. The external surface of the cup is coated with an enrober utilizing the coating material stored in the reservoir 11. The excess coating material is collected in the reservoir 22 disposed below the cup and recycled by pump 13 through conduit 23 back to the reservoir 11. It is readily apparent that in conducting the spray and spin process of FIG. 4 and the fill and dump process of FIG. 5 either the inside or the outside of the cup could be selectively coated, by utilizing only a portion of the overall process.

Alternatively to utilizing a sugar solution as discussed hereinabove, sugar per se was melted at about 275° F. and then processed by the three methods discussed above, that is, the spraying method of system (1), the fill and dump method of system (2) and the flow-coating method of system (3). The obvious problem encountered in using only sugar is that the hot sugar syrup requires complicated heating mechanisms for recovering the surplus sugar and for retaining the temperature during the process to prevent crystallization. Given the appropriate engineering input, it is conceivable that a complete heating system could be developed so as to handle molten sugar, but as a practical reality, the cleanup and maintenance of the system would present almost insurmountable obstacles. In addition, at 275° F. it is very difficult to find flavors that will not volatilize so that, even if, arguendo, it would be possible to process a sugar coating per se on the inside of an edible container, the sugar would have a relatively bland flavor.

As discussed hereinabove, when using a sugar syrup with a sugar content of 70 to 79% by weight, a gum is advantageously added to the coating composition to facilitate the adhesion of the coating to the surface of the food container. In this regard, starches and modified starches can also be used as an additive to a sugar slurry in place of the gums as recited hereinabove for achieving the same purpose.

The following are typical formulations wherein starch is used in place of a gum. As will be noted, considerably more starch is needed than in a comparable sugar-gum system. However, when starches are used, they contribute solids to the mixture so that the total amount of sugar is therefore reduced as illustrated:

| Example 5 | | |
|---|---|---|
| Sugar | 68 parts | (68% by weight) |
| Film Set Starch | 15 parts | (15% by weight) |
| (National Starch Co.) | | |
| Flavor and Color | 1 part | (1% by weight) |
| Water | 16 parts | (16% by weight) |
| Example 6 | | |
| Sugar | 73 parts | (73% by weight) |
| Crisp Film Starch | 5 parts | (5% by weight) |
| Flavor and Color | 1 part | (1% by weight) |
| Water | 21 parts | (21% by weight) |
| Example 7 | | |
| Sugar | 63 parts | (63% by weight) |
| Starch | 20 parts | (20% by weight) |
| Water | 16 parts | (16% by weight) |
| Flavor and Color | 1 part | (1% by weight) |

Advantageously the starches are used in an amount of about 5 to 20% by weight, based on the total weight of the coating composition.

Food containers which have been flow-coated on the interior surface thereof can also be coated, for example, spray coated, on the exterior surface thereof.

Using vigorous agitation to prevent crystallization when handling small batches of a sugar syrup and by using other mechanical aids to maintain the integrity of the mixture, flow coating can be effectively utilized to provide a hard, dry coating on the edible food container. After the containers have been flow-coated, they are placed in an oven which is held at a temperature above the boiling point of the concentrated sugar solution. Since the highest temperature at which a sugar syrup of 81 Brix (maximum anticipated concentration) will boil at atmospheric pressure is 230° F., the oven is set at 250° F. which is the maximum temperature at which the flavor can be maintained. The drying time varies with variations in air velocity, so that the drying time can range from 30 seconds to as high as 30 minutes with an optimum time period being in the one to two minute range.

As stated hereinabove, if a harder film is desired, the alginate gum is used in the coating composition. The flow-coated containers can be also recoated or sprayed with a 2% solution of calcium chloride which crosslinks the alginate into a harder film.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

It is claimed:

1. A continuous apparatus for providing a barrier coating composition on the interior and exterior surfaces of an edible food container which comprises
   a first conveyor system containing a plurality of container receiving stations,
   a second conveyor system containing a plurality of container receiving stations, said second conveyor being disposed below said first conveyor system,
   a vacuum system operatively associated with the container receiving stations of the first and second conveyor systems,
   a dispensing means for sequentially placing the edible food containers in the container receiving stations of the first conveying system,
   coating means operatively associated with the first conveyor system for coating the internal surface of the edible food container with the barrier coating composition, means operatively associated with the first conveyor system for spinning and drying the barrier coating composition in the internal surface of the edible food container, means for moving the first conveyor system to invert the edible food container to a position above a container receiving station disposed on the second conveyor system and transferring said edible food container to said container receiving station on the second conveyor system in an inverted position, coating means operatively associated with the second conveyor system for coating the external surface of the edible food containers with the barrier coating composition, and means operatively associated with the second conveyor system for spinning and drying the barrier coating composition on the external surface of the edible food container.

2. The apparatus of claim 1 wherein the coating means are spray means.

3. The apparatus of claim 1 wherein the coating means comprises a system for filling the edible food containers with the barrier coating composition in the first conveyor system and dumping the excess into an overflow container for recycling the coating composition to said filling system, and an enrobbing system for coating the external surface of the edible food containers with the coating composition in the second conveyor system and providing an overflow container for recovering the excess coating material for recycle to the enrobbing system.

* * * * *

UNITED STATES PATENT AND TRADEMARK OFFICE
CERTIFICATE OF CORRECTION

PATENT NO. : 4,505,220

DATED : March 19, 1985

INVENTOR(S) : Herbert M. Bank and Irving H. Rubenstein

It is certified that error appears in the above-identified patent and that said Letters Patent is hereby corrected as shown below:

Column 1, line 46, "frequency" should be --frequent--.

Column 7, line 49, "6" should be --7--.

Signed and Sealed this

Thirteenth Day of August 1985

[SEAL]

Attest:

DONALD J. QUIGG

Attesting Officer  Acting Commissioner of Patents and Trademarks